Dec. 9, 1969   W. E. SPLINTER ET AL   3,482,379
TOBACCO TOPPER

Filed Oct. 4, 1966   3 Sheets-Sheet 1

INVENTORS
WILLIAM E. SPLINTER
CHARLES W. SUGGS
BY
*John J. Mills*
ATTORNEY

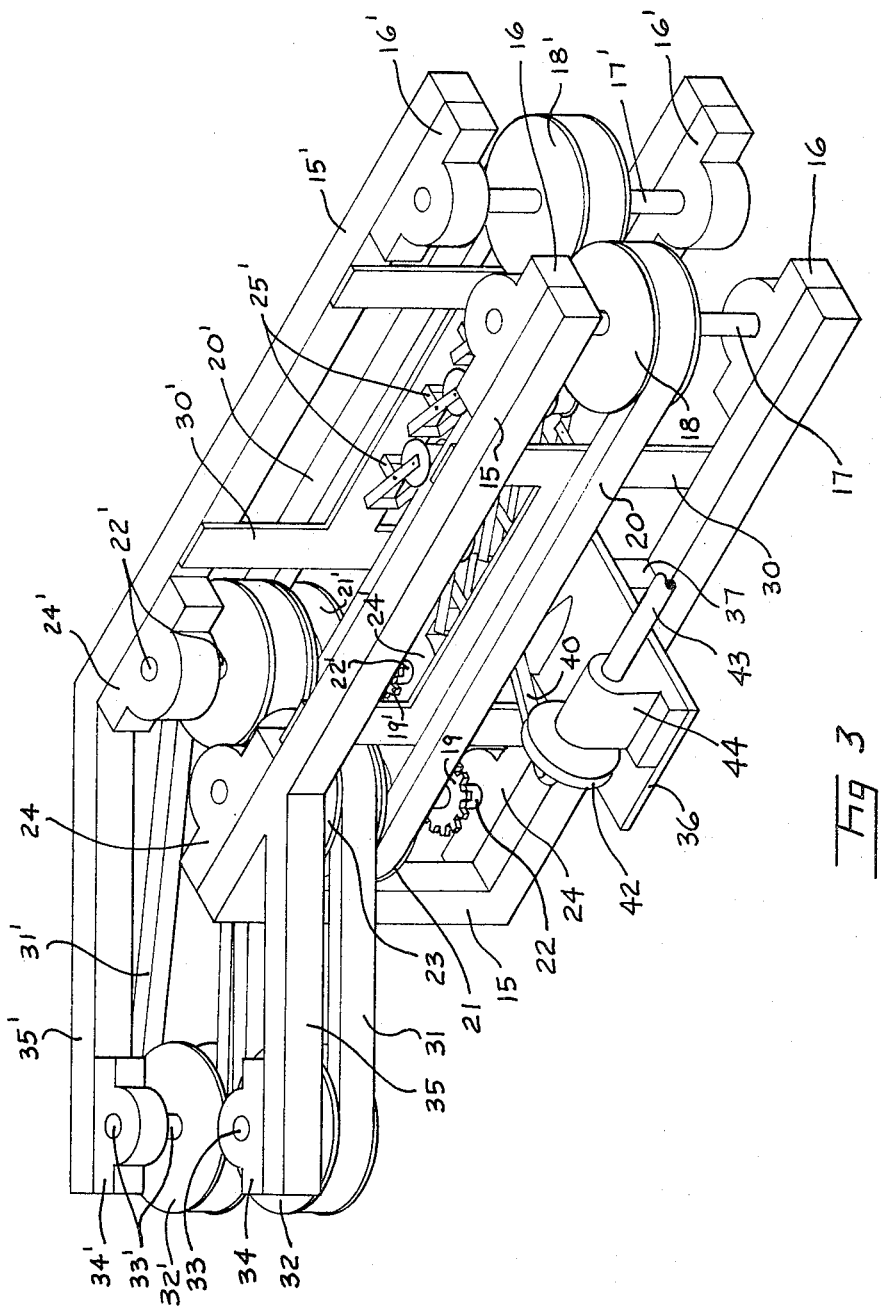

Dec. 9, 1969   W. E. SPLINTER ET AL   3,482,379
TOBACCO TOPPER
Filed Oct. 4, 1966   3 Sheets-Sheet 3
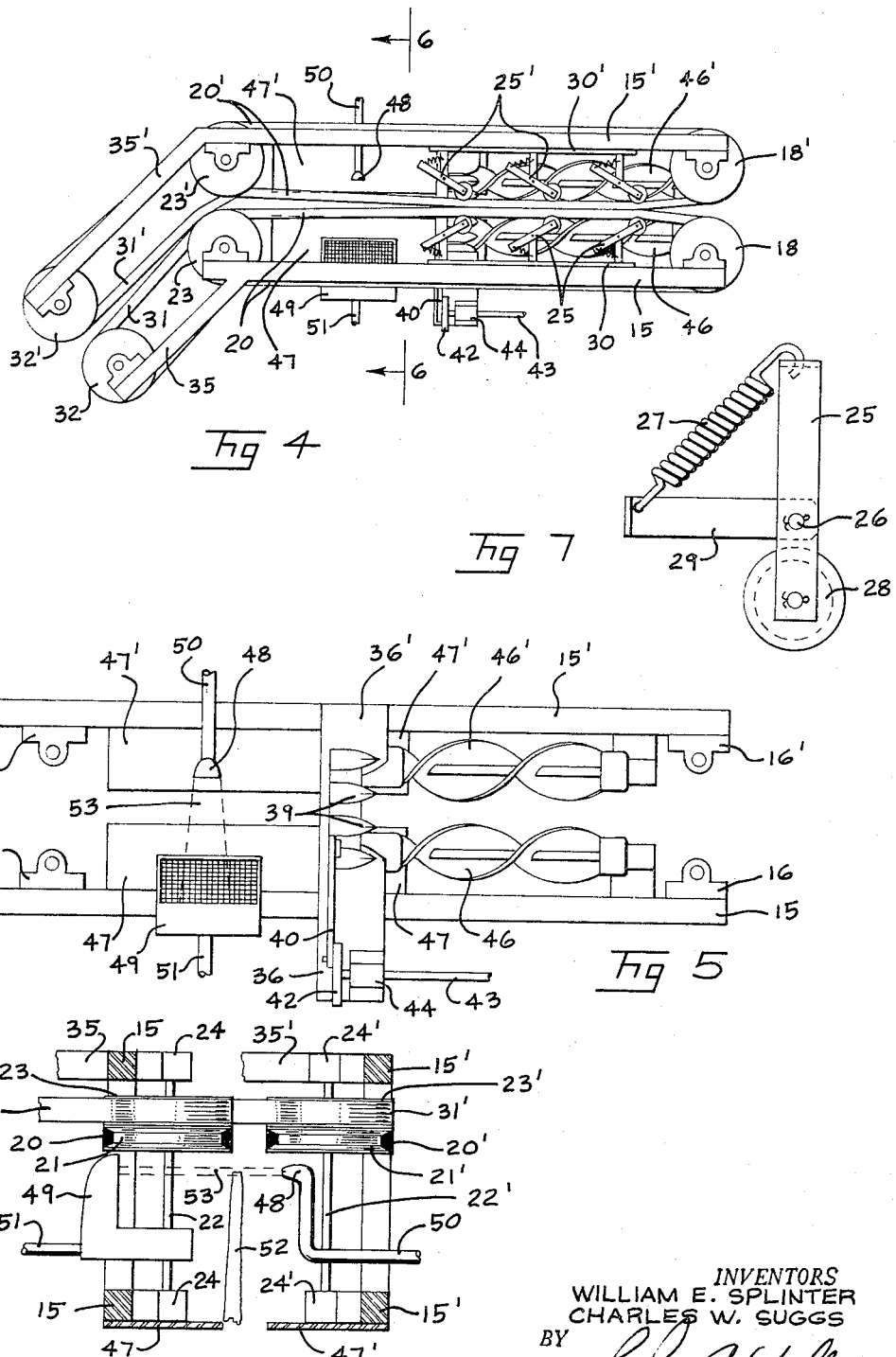
INVENTORS
WILLIAM E. SPLINTER
CHARLES W. SUGGS
BY
ATTORNEY

United States Patent Office 3,482,379
Patented Dec. 9, 1969

3,482,379
TOBACCO TOPPER
William E. Splinter, 31 Shepherd St. 27607, and Charles W. Suggs, 1507 Trailwood Drive 27606, both of Raleigh, N.C.
Filed Oct. 4, 1966, Ser. No. 590,172
Int. Cl. A01d *45/16, 41/06*
U.S. Cl. 56—63                8 Claims

ABSTRACT OF THE DISCLOSURE

In abstract, a preferred embodiment of this invention is a self-propelled agricultural implement which, once adjusted, automatically severs the upper portion from the lower portion of stalk type plants growing in rows and deposits the severed upper portion in the open area between the rows.

---

This invention relates to agricultural implements and more particularly to implements designed to mechanically remove the flowering top portions of tobacco plants.

In the past, one of the more drudgerous tasks in the normal sequence of cultural operations in raising tobacco has been the breaking out of the flowering portion of the tobacco plant just after initiation of flowering. The removal of this portion of the plant is of considerable economic importance since yields are increased on the order of twenty to thirty percent (20% to 30%) or a dollar of something over $200 per acre for the average farmer.

The topping operation forces the plant to initiate a sucker growth at the leaf axils. These suckers must in turn also be removed to obtain maximum yield from the crop. At the present time, it requires on the order of forty (40) man hours per acre to top and sucker tobacco by hand. Chemicals have been developed in the last few years which inhibit cell division which in turn inhibit sucker growth. The use of these chemicals, one of the more popular of which is sold under the brand name of MH-30, has allowed some reduction in the labor force required since sucker growth is greatly inhibited. At the present time, however, all tobaccos including flue-cured, burley and cigar types are topped by hand.

After many years of research and actual experimentation with units of various configurations, applicants have developed an automatic mechanical tobacco topper which is vertically adjustable to the height of the stalk being cut, pushes the top leaves down and away from the cutting operation, grasps the stalk firmly and passes it through a cutting mechanism, applies a sucker control chemical just below the cut portion thereof and finally removes the severed flowering portion of the stalk to an area between the crops rows. The overall unit is designed so the tobacco plants are completely undamaged by this topping and sucker control application operation.

An object, therefore, of the present invention is to provide a mechanical agricultural implement capable of automatically removing the flowering portion of a tobacco plant, depositing the severed portion between the rows of plants and automatically applying a sucker inhibiting chemical.

Another object of the present invention is to provide a mechanical tobacco topper having means for guiding and supporting a tobacco plant as it passes through the severing mechanism.

A further object of the present invention is to provide an automatic tobacco topper having means for severing the flowering portion of tobacco plants without injuring the tip leaves thereof.

Another object of the present invention is to provide an automatic means for depressing the top leaves of a tobacco plant just below the flowering portion to prevent damage to said leaves during the severing operation of the flowering portion.

Another object of the present invention is to provide an automatic means for removing the severed flowering portion of a tobacco plant from the area immediately adjacent such plant and depositing said portion in an area adjacent to the row along which the device is traveling.

Another object of the present invention is to provide means for applying sucker control chemicals to the portion of stalk immediately below the severing point during automatic topping operations.

Another object of the present invention is to provide a means for recovering, recirculating and reusing unused sucker control chemicals in the operation of an automatic mechanical tobacco topper and sucker control applicator device.

A further object of the present invention is to provide an automatic mechanical tobacco topping device which incorporates means for removing the severed portion of the plant from the adjacent area and means for applying sucker growth inhibiting chemicals to the tobacco stalk.

Other objects and advantages of the present invention will become apparent and obvious from a study of the following description and the accompanying drawings which are merely illustrative of the present invention.

In the drawings:

FIG. 3 is a perspective view on a still further enlarged scale of the topper of the present invention showing the relationship of the various parts thereof when removed from the carrying vehicle;

FIG. 4 is a top plan view of such topper;

FIG. 5 is an enlarged view taken through lines 5–5 of FIG. 2;

FIG. 6 is a fragmentary view of the sucker control applicator mechanism taken from lines 6—6 of FIG. 5; and FIG. 7 is an enlarged plan view of a pressure mechanism; and FIG. 8 is a perspective of a modified cutting means.

Figure 1:
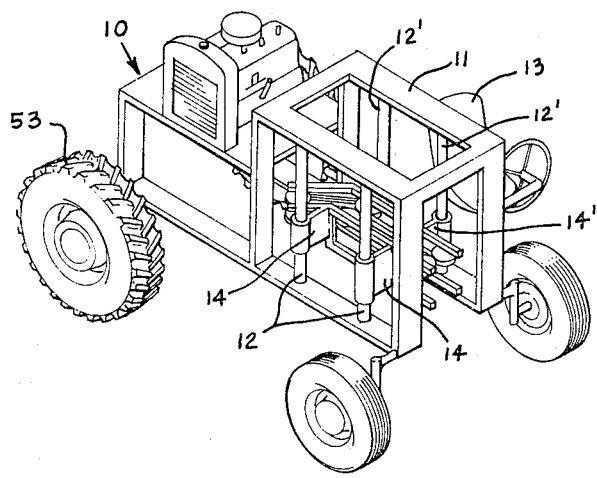
FIG. 1 is a perspective of a self-propelled agricultural implement showing one manner in which the device of the present invention may be mounted.

With further reference to the drawings, FIG. 1 discloses a self-propelled tractor type vehicle 10 having a box shaped frame 11 mounted thereon. Pairs of raising and lowering mechanisms 12 and 12' are provided on either side of frame 11. These mechanisms are generally vertically disposed and may be in the form of either hydraulic cylinders, worm gears or similar prime movers. They are all activated simultaneously by any convenient means (not shown) by the driver of the tractor from his seat 13. The purpose of these mechanisms is to raise and lower the topper unit in relation to the ground so that the varying heights of plants may be compensated for.

Two seats of arms 14 and 14' are provided which operatively connect raising and lowering mechanisms 12 and 12' to the mechanical topping unit.

Two generally U-shaped side frame members 15 and 15' are provided in parallel spaced relation particularly as disclosed in FIG. 3.

Sets of arms 14 and 14' are secured respectively to side frame members 15 and 15' particularly as disclosed in FIG. 1.

Two pairs of forward bearing blocks 16 and 16' are fixedly secured to the forward portions of side frame members 15 and 15' in a facing relationship. Forward shafts 17 and 17' are vertically disposed between each of the pairs of forward bearing blocks. Forward pulleys 18 and 18' are fixedly secured to forward shafts 17 and 17' respectively intermediate the bearing blocks.

Stalk engaging V belts 20 and 20' are operatively mounted at the end around forward pulleys 18 and 18' respectively and at the other end around lower pulleys 21 and 21'. Said lower pulleys are in turn fixedly secured to rear shafts 22 and 22' respectively. Mounted just above said lower pulleys 21 and 21' are upper pulleys 23 and 23' which are likewise fixedly secured to shafts 22 and 22'. Tow sets of rear bearing blocks 24 and 24' are provided in which shafts 22 and 22' respectively are adapted to rotate. Fixedly secured to rear shafts 22 and 22' respectively are sprockets 19 and 19' mounted between the lower pulleys and the rear bearing blocks. These sprockets are adapted to be driven by a chain means (not shown) which is in turn driven by means such as a power take off, wheel or other means (not shown) attached to tractor 10.

Two sets of pressure mechanisms 25 and 25' are provided, intermediate pulleys 18 and 21, and pulleys 18' and 21'. These mechanisms are adapted to press against the inside of belts 20 and 20' thus holding the same firmly against each other. To allow adequate separation of the belts as a stalk is gripped therebetween and moves through the topper of the present invention, pivot points 26 are provided on each of the pressure mechanisms 25 in such a manner that spring biasing means 27 will exert a predetermined amount of pressure between roller 28 and mounting bracket 29 particularly as disclosed in FIG. 7. Each of the sets of pressure mechanisms 25 and 25' are mounted on side frame members 15 and 15' respectively by means such as mounting frames 30 and 30'.

In operative engagement with upper pulleys 23 and 23' are flower head engaging belts 31 and 31'. Side pulleys 32 and 32' are also in operative engagement with said belts. These last mentioned pulleys are rotatably mounted on downwardly projecting side shafts 33 and 33' respectively which in turn have their upper portions fixedly secured to mounting blocks 34 and 34'. Rear frame members 35 and 35' are provided which are fixedly secured at one end to side frames 15 and 15' and at the other end fixedly support mounting blocks 34 and 34'. Rear frame members 35 and 35' are parallely disposed at an acute angle to said side frames.

Horizontally disposed support plates 36 and 36' are mounted below stalk engaging belts 20 and 20' intermediate the forward and rear shafts. These plates are separated by a longitudinal opening 45 which is wide enough to allow tobacco stalks to pass therebetween. Blocks 37 and 37' fixedly mount said support plates on side frame members 15 and 15' respectively. Bridging opening 45 and slideably mounted on base plates 36 and 36' is a cutting means such as an inverted sickle bar or similar cutting means 38 having teeth 39 forwardly projecting therefrom. The inversion of the sickle bar serves the purpose of preventing dragging or tipping of the stalk following the severing of the flower head. Should this happen, the stalk will whip or snap through the sucker control application area to prevent proper deposit of the inhibiting chemical.

To reciprocate the sickle bar during the cutting operation, a connecting rod 40 may be provided which is pivoted at one end about point 41 and is rotatably mounted on drive wheel 42 at the other end. The drive wheel is fixedly secured to one end of a drive shaft 43 which is rotatively mounted through bearing block 44. The end of drive shaft 43 opposite the end mounting drive wheel 42 may be connected to any convenient source of rotative power such as a conventional power take off (not shown) mounted on tractor 10.

Figure 2:
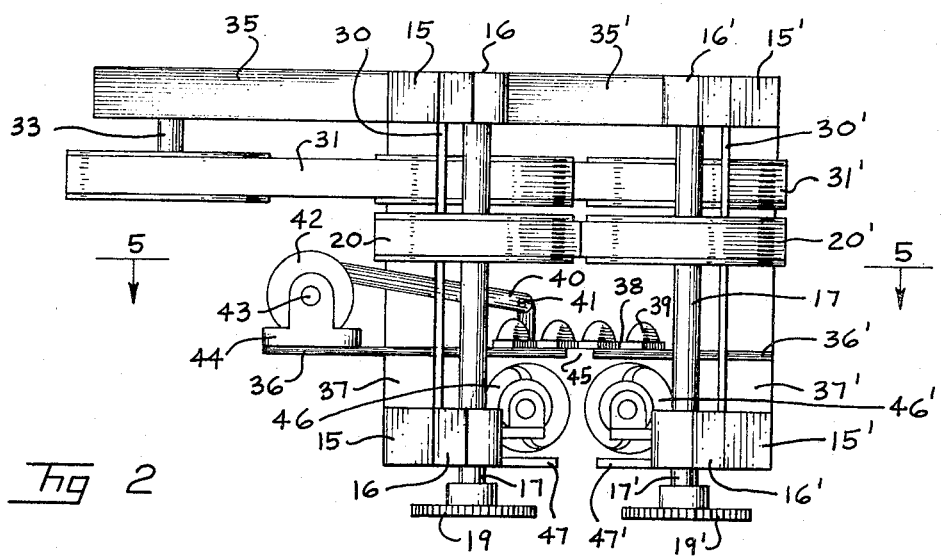
FIG. 2 is a front elevational view on an enlarged scale of the tobacco topper of the present invention.

A pair of spiral rubber wipers 46 and 46' are rotatively mounted in the front portion of the topping device below sickle bar 38 and parallel to side frame members 15 and 15', particularly as disclosed in FIGS. 2 and 5. These wipers are adapted to be rotated in opposite directions by a source of rotative power (not shown) such as that herein before described.

Parallelly disposed and fixedly secured to the lower portion of frame members 15 and 15' are leaf depresser plates 47 and 47'' which extend in a horizontal plane from adjacent rear bearing blocks 24 and 24' to a position adjacent to the rear portion and immediately below wipers 46 and 46'.

Mounted above plate 47', preferably rearwardly of sickle bar 38 and in the horizontal plane with or immediately below said sickle bar is nozzle 48. A catch pan 49 is mounted above plate 47, across opening 45 from and in operative relation with said nozzle 48. Inlet pipe 50 allows the sucker inhibiting chemical to pass into nozzle 48, spray across opening 45 and into catch pan 49 where it leaves by return pipe 51 to a recirculating pump (not shown) which recirculates the chemical back through pipe 50 in a continuing cycle.

In actual operation of the present invention, tractor 10 straddles the row of tobacco to be topped with its wheels between the rows on either side. As the tobacco plant is approached, the operator of the tractor riding in seat 13 adjusts the vertical height of the topper so that the tobacco stalk will be severed just below the flowering portion of the plant and above the tip leaves. The tobacco stalk then comes into contact with belts 20 and 20' which along their contactive area travel rearwardly at an equivalent speed to the tractor's forward motion thereby actually having zero speed relative to the growing tobacco plant and the ground.

As the stalk is held in relative fixed position by belts 20 and 20' with proper pressure on said stalk being assured by sets of pressure mechanisms 25 and 25', clockwise rotating flexible wiper 46 and counterclockwise rotating flexible wiper 46' gently push the upper or tip leaves of the plant downwardly and outwardly away from the portion of the stalk about to be cut. As the tractor moves forward, the now depressed leaves pass below leaf depresser plates 47 and 47' thereby protecting them and the remainder of the plant during the flower severing and sucker control application operations.

Immediately following the passing of the stalk into opening or slot 45, the reciprocating teeth 39 of sickle bar 38 sever the flower head from the tobacco plant below belts 20 and 20'. The tobacco plant is now released from the topper device although the tip leaves are being passed over by pressure plates 47 and 47'. As the tractor moves forward, the tobacco stalk 52 passes through the chemical stream indicated at 53 which applies the growth inhibiting chemical to the stalk. It is obvious that any of the chemical which does not come into contact with stalk passes into catch pan 49 and is recirculated back through nozzle 48 in a continuous circulation cycle. A screen may be placed over the open portions of catch pan 49 to prevent trash, parts of flower heads and other impurities from entering such pan which might result in clogging of the system.

As the tobacco stalk is having the sucker inhibiting chemical applied thereto, the now severed flower head is moving rearwardly relative to the top still gripped between belts 20 and 20'. As the head approaches lower pulleys 21 and 21', belts 31 and 31' mounted on upper pulleys 23 and 23' grip the head and move it rearwardly and to one side at a change in direction of travel of about 30 to 45 degrees. This moves the severed tops to a position between the rows of plants where it is deposited in front of the rear wheel 53 of the tractor where it will be crushed and flattened. This prevents the undesirable effects of depositing the top directly into the row which could cause leaf breakage and discoloration due to foreign objects remaining in contact with the leaves.

By utilizing the present level of agricultural technology, uniform stands of tobacco plants can be accomplished thus reducing to a minimum the amount of vertical adjustment necessary during actual operation of the device of the present invention.

Even though what appears to be the preferred embodiment of the present invention has been disclosed and described, other modifications such as a rotating blade could be substituted for the sickle bar, the use of sponge rubber or brush applicators for applying the sucker control chemical and the like are among the changes possible.

It will be obvious from the foregoing description that the present invention has the advantages of providing a reliable mechanical means for removing the flowering portions of tobacco plants without damaging the remainder of the plant. The device also provides for sucker control chemicals to be automatically applied to the tobacco stalk at or below the severed area while eliminating all waste by catching and recirculating the unused chemical. It also provides a simple means for removing the severed flower portion away from the tobacco plant and depositing between the rows of plants thereby eliminating all danger of the flower injuring or damaging the growing plants.

The terms "upper," "lower," "front," "rear" and so forth have been used herein merely for convenience in the foregoing specification to describe the tobacco topper and its parts as oriented in the drawings. It is to be understood, however, that these terms are in no way limiting to the inevntion since the topper may obviously be disposed in many different positions when in use.

The present invention, of course, may be carried out in other specific ways than those herein set forth without departing from the spirit and essential characteristics of the invention. The present embodiments are, therefore, to be considered in all respects as illustrative and not restrictive and all changes coming within the meaning and equivalency range are intended to be embraced herein.

What is claimed is:

1. An agricultural implement comprising: a vehicle carrier means; grip means adjustably mounted on said vehicle whereby the upper portion of the stalk of a plant may be gripped in relative fixed relation to the ground as the vehicle travels over said plant; leaf moving means mounted on said vehicle below said gripping means for forcing the leaves of the gripped plant away from a predetermined area of said stalk; cutting means mounted on said vehicle rearwardly of said leaf moving means for severing the upper portion of the plant at a predetermined location on the stalk; applicator means mounted on said vehicle rearwardly of said cutting means to automatically apply a growth inhibiting chemical to the stalk adjacent to the severed area; and conveyor means mounted on said vehicle communicating with and projecting rearwardly from said grip means for removing the severed portion of the plant away from the area adjacent said plant.

2. The device of claim 1 wherein the plant gripping means is composed of two endless belts contacting each other along a portion of their travel and traveling, in the area of contact, rearwardly at a speed equal to the forward speed of the vehicle whereby said area is maintained at approximately zero ground speed.

3. The device of claim 2 wherein presser means are provided on the side of each belt opposite the area of contact with the other belt to hold said belts in contactive relation to each other.

4. The device of claim 1 wherein the means for forcing the leaves of the plant away from the stalk comprises a pair of spiral, flexible wipers horizontally disposed below said grip means on each side of the path a stalk to be cut travels.

5. The device of claim 1 wherein the severing means is an inverted sickle bar.

6. The device of claim 1 wherein the means for applying a growth inhibiting chemical includes a chemical circulating means; a nozzle operatively connected to said circulating means mounted on one side of and pointing across the path of travel of said stalk; and a catch pan means operatively connected to said circulating means mounted on the opposite side of said path whereby said chemical which does not come into contact with stalks passing through the implement is recirculated by said circulating means to said nozzle in a continuous cycle.

7. The device of claim 1 wherein the vehicle is of the high clearance type suitable to straddle a row of plants.

8. The device of claim 1 wherein the means for removing the severed portion of the plant comprises a pair of endless belts which move in contactive relationship to each other along a portion of the travel; said belts being disposed in a horizontal plane at an angle to the longitudinal travel of the vehicle.

References Cited
UNITED STATES PATENTS

| | | | |
|---|---|---|---|
| 919,106 | 4/1909 | Woods | 56—56 |
| 2,294,348 | 8/1942 | Kolstad | 171—61 XR |
| 2,368,895 | 2/1945 | Spiegl | 171—61 |
| 2,599,143 | 6/1952 | Thompson | 56—17 |
| 2,687,596 | 8/1954 | Rakestraw | 47—1 |

RUSSELL R. KINSEY, Primary Examiner

U.S. Cl. X.R.

47—1; 56—17, 27.5